United States Patent [19]
Andrews et al.

[11] Patent Number: 4,612,353
[45] Date of Patent: Sep. 16, 1986

[54] POLYAMIDE/POLYETHERIMIDE ALLOYS

[75] Inventors: Philip S. Andrews, Hamden; Kemal Onder, North Haven, both of Conn.

[73] Assignee: The Dow Chemical Company, Midland, Mich.

[21] Appl. No.: 725,723

[22] Filed: Apr. 22, 1985

[51] Int. Cl.[4] ............................................. C08L 77/00
[52] U.S. Cl. ............................................. 525/432
[58] Field of Search ................................. 525/432

[56] References Cited

U.S. PATENT DOCUMENTS

| | | | |
|---|---|---|---|
| 4,072,665 | 2/1978 | Onder | 260/78 R |
| 4,087,481 | 5/1978 | Onder | 260/857 TW |
| 4,156,065 | 5/1979 | Onder et al. | 528/51 |
| 4,448,937 | 5/1984 | Bopp et al. | 525/432 |

FOREIGN PATENT DOCUMENTS

| | | | |
|---|---|---|---|
| 0104659 | 4/1984 | European Pat. Off. | 525/432 |
| WO84/03894 | 10/1984 | PCT Int'l Appl. | 525/432 |

Primary Examiner—Lewis T. Jacobs
Assistant Examiner—A. L. Carrillo
Attorney, Agent, or Firm—James S. Rose

[57] ABSTRACT

Blends are provided comprising (a) from about 25 to about 75 percent by weight of a particular aromatic-aliphatic polyamide and (b) complementally 75 to 25 percent by weight of a particular polyetherimide.

12 Claims, No Drawings

POLYAMIDE/POLYETHERIMIDE ALLOYS

FIELD OF THE INVENTION

This invention relates to blends containing polyamides and polyetherimides and is more particularly concerned with blends of certain aromatic-aliphatic polyamides and a particular class of polyetherimides.

DESCRIPTION OF THE PRIOR ART

A series of polyamides has recently been introduced to the commercial marketplace in which the acid moiety of the polyamide is derived from a mixture of an aliphatic dicarboxylic acid and an aromatic dicarboxylic acid and the amine or amide forming moiety is derived from a diamine or diisocyanate which is aromatic in nature. Such polyamides are described in U.S. Pat. Nos. 4,072,665; 4,087,481 and 4,156,065. These polyamides are characterized by ease of melt processing and excellent physical properties including very good inherent impact strength.

Aromatic polyetherimides of the type disclosed for use in the polymer blends of U.S. Pat. No. 4,448,937 have long been known and commercially available. This patent teaches how the impact strengths of the polyetherimides can be effectively increased by the blending with a specific class of polyesteramides disclosed therein.

We have now discovered that blends prepared from the same aromatic polyetherimides and the aromatic-aliphatic polyamides discussed above not only have improved impact strengths over the virgin polyetherimides, but, quite surprisingly, have generally improved resistance to industrial solvents, particularly chlorinated solvents.

SUMMARY OF THE INVENTION

The present invention relates to novel polymer blends which comprise (a) from about 25 to about 75 percent by weight of a polyamide characterized by a recurring unit having the formula (I) (see FORMULA CHART below) wherein Ar represents arylene and, in about 30 to about 85 percent of the recurring units, R represents alkylene from 6 to 12 carbon atoms, inclusive, and in about 15 percent to about 70 percent of the recurring units R represents m-phenylene; and (b) from about 75 to about 25 percent by weight of a polyetherimide characterized by a recurring unit of the formula (II) (see FORMULA CHART below) wherein $Q^1$ is a divalent radical selected from the group consisting of IIa, IIb, and IIc (see FORMULA CHART) wherein each $R^1$ is independently selected from hydrogen or methyl, each X is independently selected from hydrogen or halogen, and $R^2$ is a straight-chain or branched alkylene containing 1 to 5 carbon atoms; and $Q^2$ is a divalent radical selected from the group consisting of IId, IIe, and IIf (see FORMULA CHART).

The term "alkylene from 6 to 12 carbon atoms" means straight or branched chain alkylene having the stated total number of carbon atoms. Illustrative of alkylene are hexylene, heptylene, octylene, nonylene, decylene, undecylene, dodecylene, and isomeric forms thereof.

The term "arylene" means a divalent radical obtained by removing two nuclear hydrogen atoms from an aromatic hydrocarbon and is inclusive of phenylene, tolylene, naphthylene, diphenylylene, and methylenebis(phenylene) including the 4,4'- and 2,4'-radicals thereof, and mixtures thereof.

The term "straight-chain or branched alkylene containing 1 to 5 carbon atoms" is inclusive of methylene, ethylene, propylene, butylene, pentylene, ethylidene, propylidene, isopropylidene, and the like.

DETAILED DESCRIPTION OF THE INVENTION

The polymer blends of the invention are prepared readily by direct admixture of the individual components in any convenient manner. Illustratively, the components are admixed in comminuted form such as powder or in the form of chips, pellets and the like, using manual mixing or mechanical mixing in appropriate mixing apparatus. The resulting admixture is then optionally, and, preferably, homogenized by conventional means such as by extrusion using standard extruding equipment. The product is extruded in strand, sheet or like form and the extruded mixture is chopped or pelletized to whatever form is desired for ultimate use.

The proportions in which the two components are brought together in the blend can vary over a wide range, but, advantageously, they fall within the weight percent ranges set forth above. Preferably, the polyamide (a) is present within the range of about 35 to about 65 percent by weight and the polyetherimide being complementally within the range of 65 to 35 percent by weight.

The polyamides characterized by the recurring unit of Formula I, as set forth above, are themselves known in the art and can be prepared by processes which are well-known in the art and which are described in U.S. Pat. Nos. 4,072,665; 4,087,481 and 4,156,065 whose disclosures are incorporated herein by reference. As set forth in these patents, the copolyamides employed in the polymer blends of the invention can be made by various techniques including the melt polymerization of the appropriate dicarboxylic acids and appropriate diamines or by the acid chloride process in which the dicarboxylic acid chlorides are reacted with the appropriate amines. Preferably, the polyamides employed in the polymer blends of the invention are made by reaction of the appropriate mixtures of dicarboxylic acids with the appropriate aromatic diisocyanates or mixtures of aromatic diisocyanates. Full details of these processes are given in the aforesaid patents and will not be repeated here.

Illustrative of the polyamides which can be employed in the blends of the invention are:

1. polyamides characterized by the recurring unit of formula (I) above in which Ar represents arylene [preferably 4,4'-methylenedi(phenylene)] and, in 60 to 85 percent of said units, R is alkylene from 7 to 12 carbon atoms and, in the remainder of said units, R is m-phenylene;

2. polyamides characterized by the recurring unit of formula (I) above in which, in about 30 to 60 percent of said units, R is alkylene from 7 to 12 carbon atoms and, in the remainder of said units, R is m-phenylene, and, in about 70 to about 95 percent of said units, Ar is 4,4'-methylenebis(phenylene) and, in the remainder of said units, Ar is tolylene. Preferably those units in the polyamide in which Ar represents tolylene are also those in which R is m-phenylene.

Particularly preferred polyamides include those of the group 2 in which R in about 50 percent of the recurring units represents heptylene and Ar in about 85 percent of the recurring units represents 4,4'-methylenebis(phenylene) and, in the remainder of said units, Ar represents tolylene.

The polyetherimides characterized by the recurring unit of formula (II) are also well known in the art and are commercially available from General Electric Company under the trade name Ultem ®. They can be prepared by the process well-known in the art and described in U.S. Pat. No. 4,448,937 and U.S. patent references cited therein, all of whose disclosures relative to the polyetherimide of formula (II) are incorporated herein by reference. As set forth in these patents the polyetherimides are prepared by the reaction of the appropriate bis-ether anhydride having the diradical $Q^1$ defined above with the appropriate diamine having the diradical $Q^2$ defined above. Details of these products and processes are given in the aforesaid patents and will not be repeated here.

Preferred of the polyetherimides which can be employed in the blends of the invention are those having the molecular configuration wherein both ether oxygen radicals are substituted on the 4-position of each aromatic ring relative to the heterocyclic imide ring and those wherein the divalent radicals $Q^1$ and $Q^2$ in formula (II) represent the divalent radical (IIc) and 1,3-phenylene (IId) respectively. Particularly preferred for $Q^2$ is the 4,4'-isopropylidenebisphenylene radical, that is to say, the polyetherimide having the formula (III) below.

The polymer blends of the invention can also have incorporated therein any of the various additives such as fillers, antioxidants, pigments, fire retardants, plasticizers, reinforcing agents and the like which are commonly employed in the art in such compositions.

The blends of the invention retain all the excellent tensile and elongation properties of the individual components while at the same time showing improvements in certain properties in respect of which each component is deficient by itself. For example, the blends are characterized by improved impact strength and chemical resistance, particularly resistance to chlorinated solvents over the polyetherimide by itself. At the same time, the heat deflection temperature values of the blends are higher relative to the polyamide by itself.

The blends in accordance with the invention are characterized by HDT values measured at 264 psi in accordance with ASTM Test Method D648-56 of at least about 150° C. and tensile modulus values of at least 250,000 psi.

Accordingly, the blends of the invention are useful for all the purposes for which either the polyamides or polyetherimides themselves have been employed or can be employed. Illustrative of the uses to which the blends can be applied are the preparation of bushings, seal faces, electric insulators, compressor vanes and impellers, pistons and piston rings, gears, thread guides, cams, break linings, clutch faces, abrasive articles and the like.

The following examples describe the manner and process of making and using the invention and set forth the best mode contemplated by the inventors of carrying out the invention but are not to be construed as limiting.

EXAMPLE 1

The following experiment sets forth the preparation of a polymer blend (sample 1) in accordance with the invention by the blending together of a polyamide code named PA and a polyetherimide code named PI in the proportions in parts by weight of 75 to 25 respectively. The PA polyamide had the recurring unit (I) set forth in the FORMULA CHART wherein R in about 50 percent of the recurring units was $-(CH_2)_7-$ and in the remaining units was m-phenylene and Ar in about 85 percent of the recurring units was 4,4'-methylenebis(phenylene) and in the remaining units was 2,4-tolylene. The polyamide was prepared in accordance with U.S. Pat. No. 4,087,481 and in those recurring units in which Ar was tolylene R was m-phenylene. The polyetherimide PI had the recurring unit (III) set forth in the FORMULA CHART and was an ULTEM ® resin supplied by General Electric Company.

The blend was prepared by first grinding the pelletized components PA and PI separately in a Wiley Mill, weighing the required proportional parts of each powdered component into a rolling blender and thoroughly blending the mixture. The blend was homogenized by extrusion as a ribbon from a twin-screw Brabender with compounding screws using the following extrusion conditions: screw speed (r.p.m.)=5; die size=3/16"; power demand of 5.5–9.0 amps; temperature conditions: zone 1 320° C., zone 2 325° C. and zone 3 330° C. The ribbon was pelletized. The pellets were then injection molded into both dumbell shaped test pieces having a length=$8\frac{1}{2}$ inch, a gauge width=$\frac{1}{2}$ inch, and overall width=$\frac{3}{4}$ inch (in accordance with ASTM D638-61T test procedure) and flex bars, length=5 inch, width=$\frac{1}{2}$ inch, thickness=$\frac{1}{4}$ inch (in accordance with ASTM D790-63 test procedure). The injection molding machine was an Arburg Model 220E/150 with the following molding conditions: pressure (psi)=9300;screw speed (r.p.m.)=110; injection time=15 seconds; zone 1 320° C.; zone 2 330° C.; nozzle zones 3 320° C.; mold=160° C.

The same shaped injection molded test pieces of the individual PA and PI polymers were similarly prepared for comparison testing.

The physical properties of the PA, PI and sample 1 are set forth in Table I. Sample 1 had an impact strength almost twice the value of PI without losing tensile properties and while maintaining good high temperature resistance.

Table II sets forth a comparison of the resistance to a series of typical industrial fluids of PA, PI, and sample 1. The test samples were cut into pieces measuring $2''\times\frac{3}{4}''\times\frac{1}{8}''$, weighed and immersed in the solvents for the test periods shown at 30° C. The samples were removed and dried prior to being reweighed and remeasured. The change in weight ($\Delta W$) and volume ($\Delta V$) for each sample is recorded in Table II.

Sample 1 was observed to have resistance to the majority of the solvents comparable to that of PA and PI, and, in the case of methylene chloride and o-dichlorobenzene, to be much superior to the PI polymer. Sample 1 was also superior to PI in the case of ammonium hydroxide and ethyl acetate.

TABLE I

| Sample | PA | PI | 1 |
|---|---|---|---|
| $T_g$ (Gehman)[1] | 156° C. | 200° C. | 167° C. |
| $T_g$ (TMA)[2] | 163° C. | 217° C. | 167° C. |
| Tensile str. (psi)[3] | | | |
| Yield | 14,195 | 14,817 | 14,311 |
| Break | 11,671 | 11,645 | 11,847 |
| Elongation, %[3] | | | |
| Yield | 9% | 7.4% | 8.6% |
| Break | 33% | 22.7% | 11% |
| Tensile modulus (psi)[3] | 325,253 | 347,895 | 333,384 |

TABLE I-continued

| Sample | PA | PI | 1 |
|---|---|---|---|
| Notched Izod[4] ft-lbs/inch of notch | 2.76 | 0.94 | 1.82 |
| Heat Deflection Temp. (°C.)[5] at 264 psi | 140° C. | 191° C. | 149° C. |

Footnotes to TABLE I
[1]$T_g$ is the Gehman glass transition temperature determined from a plot of shear modulus vs. temperature determined using the procedure of ASTM D1053-58T on a modified Gehman Torsion Stiffness Tester fitted with a heavy duty furnace to allow operation up to 500° C.
[2]This value of $T_g$ is the thermomechanical analysis (TMA) softening point determined on a sample using the Du Pont 990 Thermal Analyzer in the TMA mode and using a 5 g. loading on the penetration probe.
[3]Tensile property values represent average of six determinations in all cases.
[4]Determined in accordance with ASTM Test Method D-256-56 and determined as average value of 10 specimens.
[5]HDT measured in accordance with ASTM Test D648-56 and determined as average value of 2 test bars.

TABLE II

% Change in weight and volume

| | Sample PA | | | PI | | | 1 | | |
|---|---|---|---|---|---|---|---|---|---|
| Solvent: | 7 days | 28 days | 3 months | 7 days | 28 days | 3 months | 7 days | 28 days | 3 months |
| Methylene Chloride | | | | | | | | | |
| ΔW | 3.68 | 9.9 | 21 | Dissolved | — | — | 18.12 | 43.1 | 63 |
| ΔV | 2.88 | 7.8 | 17 | — | — | — | 15.88 | 37.3 | 56 |
| o-Dichlorobenzene | | | | | | | | | |
| ΔW | 0.17 | 0.53 | 0.74 | Crumbled | — | — | 0.40 | 0.49 | 0.71 |
| ΔV | −0.10 | 0.25 | 0.35 | — | — | — | 0.17 | 0.26 | 0.32 |
| 1,1,2-Trichloroethane | | | | | | | | | |
| ΔW | 0.34 | 0.47 | 0.72 | 0.11 | 0.21 | 0.32 | 0.35 | 0.51 | 0.66 |
| ΔV | 0.13 | 0.10 | −1.7 | 0.25 | 0.25 | 0.17 | 0.21 | 0.28 | 0.23 |
| Methanol | | | | | | | | | |
| ΔW | 5.90 | 9.9 | 15 | 0.54 | 1.1 | 2.0 | 3.40 | 6.7 | 11.0 |
| ΔV | 7.10 | 11.9 | 18 | 0.52 | 0.92 | 1.9 | 4.02 | 7.9 | 13.0 |
| 95% Ethanol | | | | | | | | | |
| ΔW | 1.7 | 3.1 | 5.8 | 0.22 | 0.34 | 0.69 | 0.78 | 1.3 | 2.5 |
| ΔV | 1.8 | 3.5 | 2.8 | −0.01 | 0.07 | 4.5 | 0.60 | 1.3 | 2.5 |
| Gasohol[1] | | | | | | | | | |
| ΔW | 0.49 | 1.0 | 1.6 | 0.12 | 0.31 | 0.39 | 0.41 | 0.71 | 1.2 |
| ΔV | 0.44 | 0.70 | 1.2 | 0.06 | 0.12 | 0.19 | −0.34 | −0.10 | 0.35 |
| Ammonium Hydroxide | | | | | | | | | |
| ΔW | 1.00 | 1.8 | 3.3 | 0.79 | 1.5 | −8.4 | 1.04 | 1.9 | 4.0 |
| ΔV | 0.73 | 1.7 | 2.6 | 0.29 | 0.86 | −9.3 | 0.60 | 1.3 | 3.1 |
| 10% NaOH | | | | | | | | | |
| ΔW | 0.89 | 1.6 | 2.5 | 0.49 | 0.88 | 1.6 | 0.81 | 1.5 | 2.3 |
| ΔV | 0.44 | 1.1 | 1.7 | 0.12 | 0.21 | 0.83 | 0.42 | 0.9 | 1.5 |
| Methylethyl Ketone | | | | | | | | | |
| ΔW | 1.8 | 5.5 | 11 | 1.6 | 3.9 | 8.3 | 1.6 | 4.6 | 10 |
| ΔV | 1.8 | 6.7 | 13 | 2.2 | 5.3 | 12 | 2.0 | 5.9 | 13 |
| Ethyl Acetate | | | | | | | | | |
| ΔW | 0.39 | 0.86 | 1.7 | 1.07 | 2.6 | 5.7 | 0.39 | 0.82 | 1.8 |
| ΔV | 0.27 | 0.65 | 1.4 | 1.19 | 2.9 | 6.5 | 0.38 | 0.71 | 1.6 |
| Skydrol-500[2] | | | | | | | | | |
| ΔW | −0.18 | −0.77 | −2.9 | 0.13 | 0.31 | 0.42 | 0.42 | 0.75 | 1.2 |
| ΔV | −0.44 | −1.1 | −3.2 | −0.01 | 0.17 | 0.21 | 0.02 | 0.31 | 0.70 |

Footnotes to TABLE II
[1]Gasohol is unleaded gasoline with 10% ethanol.
[2]Skydrol-500 is a hydraulic airline fluid.

the same solvents and procedure according to Example 1, is set forth in Table IV.

The heat resistance, in terms of the HDT value, and impact strength are superior to the corresponding values for PA and PI, respectively, set forth in Table I above. At the same time the other physical properties remain essentially unchanged. The solvent resistance of sample 2 was observed to be generally good and superior in resistance to methylene chloride and particularly o-dichlorobenzene.

TABLE III

| Sample | 2 | 3 |
|---|---|---|
| $T_g$ (Gehman) | 190° C. | — |
| $T_g$ (TMA) | 173° C. | — |
| Tensile str. (psi)[1] | | |
| Yield | 14,119 | 15,700 |
| Break | 12,011 | 12,700 |
| Elongation, %[1] | | |
| Yield | 8.1% | 7.5% |
| Break | 35% | 11.5% |
| Tensile Modulus (psi)[1] | 342,350 | 383,530 |
| Notched Izod[2] ft-lbs/inch of notch | 1.39 | 0.71 |
| Heat Deflection Temp. (°C.)[3] at 264 psi | 162° C. | 184° C. |

Footnotes to TABLE III
[1]Average of 6 determinations
[2]Average of 10 determinations
[3]Average of 2 determinations

EXAMPLE 2

Using the same PA and PI components and blending procedure set forth in Example 1 two blends (samples 2 and 3) in accordance with the present invention were prepared. Sample 2 contained the PA and PI in the proportions in parts by weight of 50/50 while sample 3 was in the ratio of 25/75 respectively.

The physical properties of the blends are set forth in Table III and the solvent resistance of sample 2, using

TABLE IV

| Solvent: | % Change in weight and volume Sample 2 | | |
|---|---|---|---|
| | 7 days | 28 days | 3 months |
| Methylene Chloride | | | |
| ΔW | 86.72 | 92.4 | 87 |
| ΔV | 78.22 | 83.5 | 80 |
| o-Dichlorobenzene | | | |
| ΔW | 0.37 | 0.69 | 2.3 |
| ΔV | 0.16 | 0.39 | 3.0 |
| 1,1,2-Trichloroethane | | | |
| ΔW | 0.26 | 0.37 | 0.46 |
| ΔV | −0.48 | −0.52 | −0.38 |
| Methanol | | | |
| ΔW | 1.20 | 2.6 | 4.9 |
| ΔV | 1.11 | 2.7 | 5.6 |
| 95% Ethanol | | | |
| ΔW | 0.47 | 0.75 | 1.3 |
| ΔV | 0.26 | 0.44 | 0.88 |
| Gasohol | | | |
| ΔW | 0.24 | 0.55 | 0.89 |
| ΔV | 0.02 | 0.29 | 0.48 |
| Ammonium Hydroxide | | | |
| ΔW | 0.91 | 1.8 | 6.1 |
| ΔV | 0.59 | 1.2 | 7.1 |
| 10% NaOH | | | |
| ΔW | 0.69 | 1.3 | 1.9 |
| ΔV | 0.35 | 0.67 | 1.1 |
| Methylethyl Ketone | | | |
| ΔW | 1.6 | 4.2 | 8.7 |
| ΔV | 2.0 | 5.4 | 11 |
| Ethyl Acetate | | | |
| ΔW | 0.43 | 0.94 | 2.0 |
| ΔV | 0.39 | 0.86 | 2.0 |
| Skydrol-500 | | | |
| ΔW | 0.38 | 0.55 | 0.93 |
| ΔV | 0.19 | 0.35 | 0.65 |

FORMULA CHART $$-\overset{O}{\underset{\|}{C}}-R-\overset{O}{\underset{\|}{C}}-NHArNH-$$ I

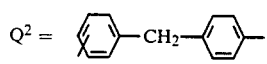 II

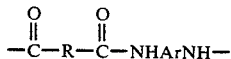 IIa

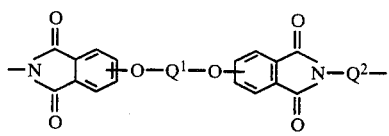 IIb

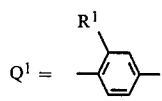 IIc

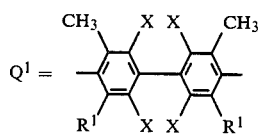 IId

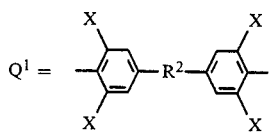 IIe

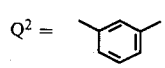 IIf

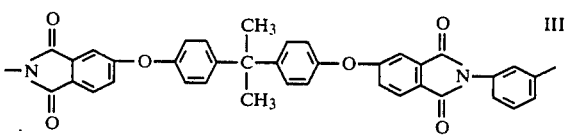 III

We claim:

1. A polymer blend which comprises
(a) from about 25 to about 75 percent by weight of a polyamide characterized by a recurring unit of the formula:

$$-\overset{O}{\underset{\|}{C}}-R-\overset{O}{\underset{\|}{C}}-NHArNH-$$ I wherein Ar represents arylene and, in about 30 to about 85 percent of the recurring units, R represents alkylene from 6 to 12 carbon atoms, inclusive, and in about 15 percent to about 70 percent of the recurring units R represents m-phenylene; and
(b) from about 75 to about 25 percent by weight of a polyetherimide characterized by a recurring unit of the formula:

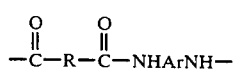 II wherein $Q^1$ is a divalent radical selected from the group consisting of

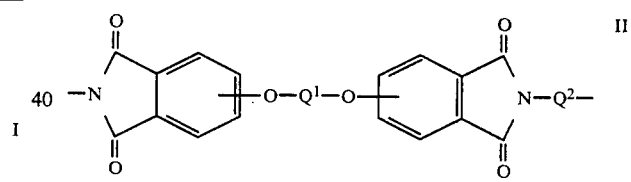, and

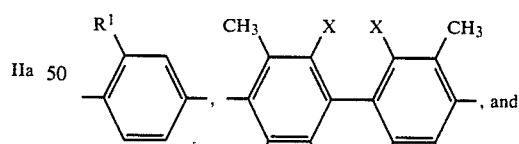

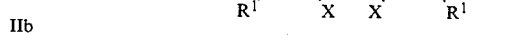

wherein each $R^1$ is independently selected from hydrogen or methyl, each X is independently selected from hydrogen or halogen, and $R^2$ is a straight-chain or branched alkylene containing 1 to 5 carbon atoms; and $Q^2$ is a divalent radical selected from the group consisting of

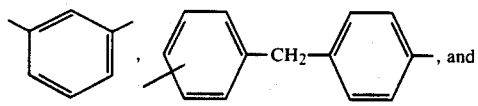

2. A polymer blend according to claim 1 wherein $Q^1$ and $Q^2$ in said polyetherimide represent

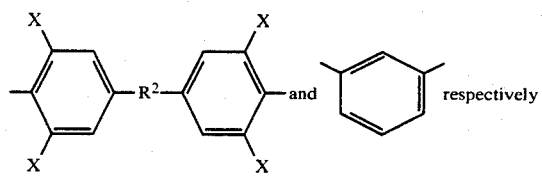 respectively wherein each X is independently selected from hydrogen or halogen and $R^2$ is a straight-chain or branched alkylene containing 1 to 5 carbon atoms.

3. A polymer blend according to claim 1 wherein said polyetherimide has the recurring unit

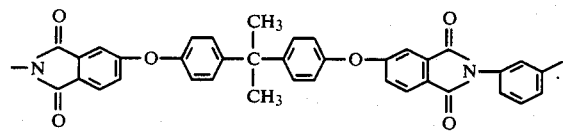

4. A polymer blend according to claim 1 wherein said polyamide is characterized in that in about 60 to about 85 percent of the recurring units, R represents alkylene from 7 to 12 carbon atoms, inclusive, and in the remainder of said recurring units, R is m-phenylene, and Ar represents 4,4'-methylenebis(phenylene).

5. A polymer blend according to claim 1 wherein said polyamide is characterized in that in about 30 to about 60 percent of the recurring units, R represents alkylene from 7 to 12 carbon atoms, inclusive, in the remainder of said recurring units R is m-phenylene, in about 70 to about 95 percent of said recurring units Ar represents 4,4'-methylenebis(phenylene) and in the remainder of said recurring units Ar is tolylene.

6. A polymer blend according to claim 1 wherein R in said polyamide is heptylene.

7. A polymer blend according to claim 1 wherein said (a) is about 35 to about 65 percent by weight of the blend and (b) is accordingly 65 to 35 percent by weight.

8. A polymer blend which comprises
(a) from about 25 to about 75 percent by weight of a polyamide characterized by a recurring unit of the formula:

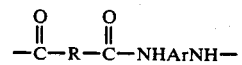

wherein R in about 30 to about 60 percent of the recurring units is heptylene and in the remainder of the recurring units R represents m-phenylene and Ar in about 70 to about 95 percent of the recurring units is 4,4'-methylenebis(phenylene) and in the remaining 5 to 30 percent of the recurring units is tolylene; and
(b) from about 75 to about 25 percent by weight of a polyetherimide characterized by a recurring unit of the formula

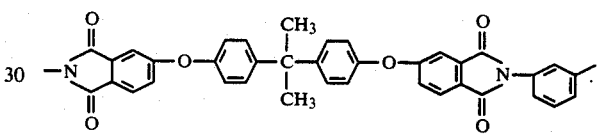

9. A polymer blend according to claim 8 wherein R in 50 percent of said recurring units is heptylene and in the remaining 50 percent is m-phenylene, and, in about 85 percent of said recurring units, Ar is 4,4'-methylenebis(phenylene) and in the remaining 15 percent is tolylene and those recurring units in which Ar is tolylene are also those in which R is m-phenylene.

10. A polymer blend according to claim 9 wherein said polyamide and said polyetherimide are 75 and 25 percent by weight respectively.

11. A polymer blend according to claim 9 wherein said polyamide and said polyetherimide are 50 and 50 percent by weight respectively.

12. A polymer blend according to claim 9 wherein said polyamide and said polyetherimide are 25 and 75 percent by weight respectively.

* * * * *